S. WOOLSON.
Potato Digger.
No. 15,628.
Patented Aug. 26, 1856.
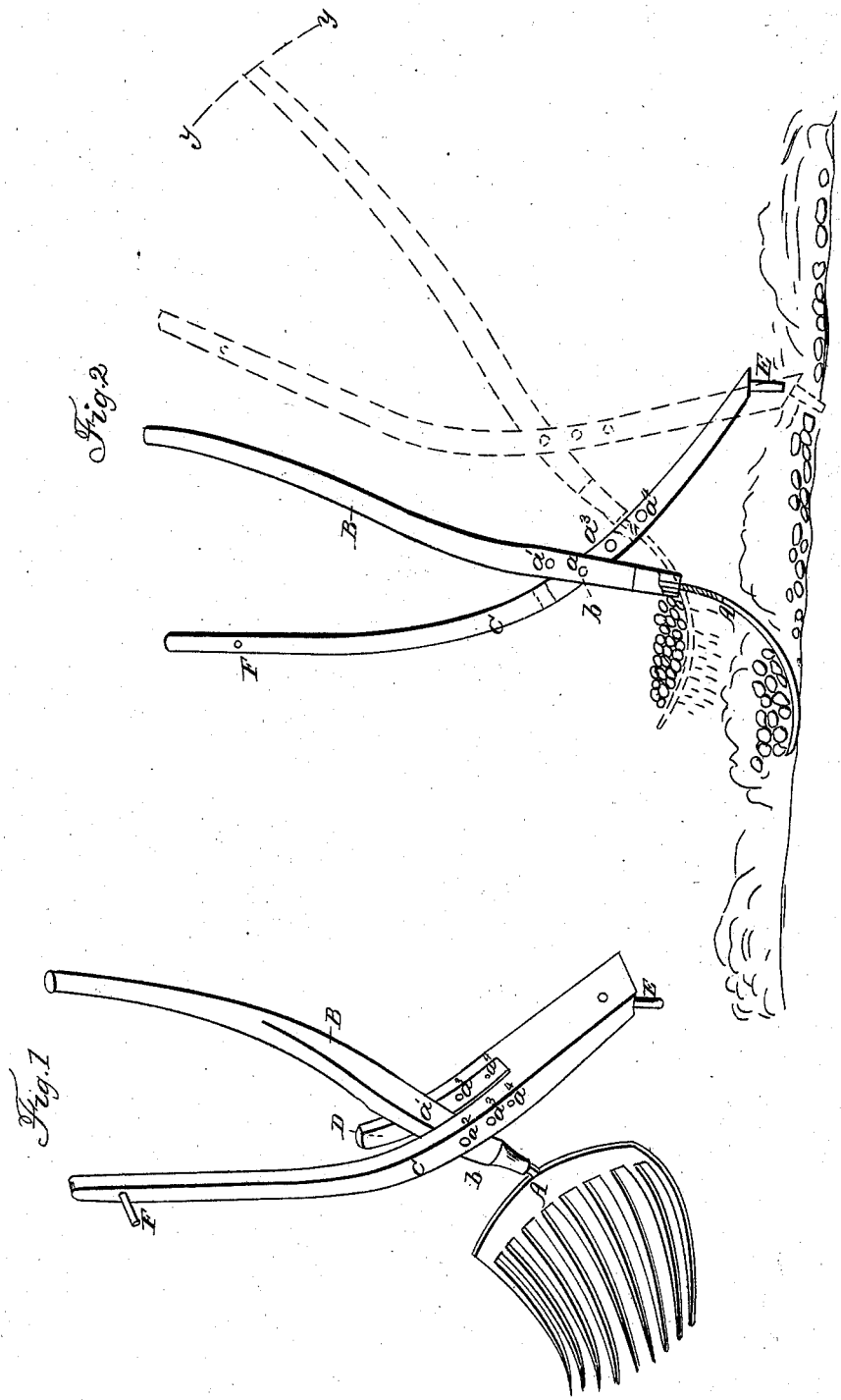

UNITED STATES PATENT OFFICE.

S. WOOLSON, OF MOODNA, NEW YORK.

IMPROVEMENT IN POTATO-DIGGERS.

Specification forming part of Letters Patent No. 15,628, dated August 26, 1856.

*To all whom it may concern:*

Be it known that I, SILAS WOOLSON, of Moodna, in the county of Orange and State of New York, have invented a new and useful Hand Implement for Digging Potatoes; and I do hereby declare that the following is a full, clear, and exact description of the same, reference being had to the accompanying drawings, forming part of this specification, in which—

Figure 1 is a perspective view of the implement. Fig. 2 is a side elevation of the same. In this view it is shown by black lines as it appears when entering a hill in order to dig up the potatoes, and by red lines as it appears after it has dug and lifted the potatoes out of the hill and is in the act of separating the dirt therefrom.

The object of my invention is to provide a hand implement for digging potatoes which is simple and cheap, and will facilitate the operation, and avoid the painful necessity of stooping in order to lift the potatoes out of the hill and separate them from the dirt.

The nature of said invention consists in the employment of an open concave shovel-digger, in combination with a movable slotted standard, in such a manner that it can be readily and conveniently forced into the hill under the potatoes, swung upward with the least possible power, so as to lift the potatoes out and above the hill, vibrated up and down so as to agitate and separate the dirt therefrom, and then lowered to an inclined position, so as to cause them to fall regularly upon the ground, ready for being gathered up.

To enable others skilled in the art to make and use my invention, I will proceed to describe its construction and operation.

A represents what I shall term the "shovel-digger," made open, like a pitch-fork, so as to separate the dirt from the potatoes, and concave, so as to retain the potatoes as they are lifted out of the hill and while the separation is being effected. B is the handle of the same, made of the usual form. It is, however, provided with several adjusting-holes, $a\ a'$, for the purpose hereinafter described.

C is the standard, to which the shovel-digger is attached by its handle. This standard is provided with an open slot, D, and has a series of adjusting-holes, $a^2\ a^3\ a^4$, similar to those, $a\ a'$, of the shovel-digger handle. In the slot D the handle B is fitted loosely, so as to play up and down freely in the path of a circle, it being confined in said slot by a fulcrum-pin, $b$, which passes through the holes $a^2\ a'$, and thus keeps the lever in place, but does not interfere with its movements. The additional holes $a^2\ a^3$ are formed in the standard so that the shovel-digger may be adjusted to suit persons of different heights; and the additional holes $a'\ a'$ are provided in the handle B in order that the shovel-digger may be adjusted to enter more or less deep into the hill.

E is an iron pin or anchor secured on the lower end of the standard, to enter the ground and keep it steady while the potatoes are being dug, lifted out of the hill, and separated.

F is an arm standing out at right angles from the upper end of the standard, for the operator to lay hold of and press down upon while said operations are being performed. It is by hanging the shovel-digger as described that the labor of lifting it, with its load, out of the hill is removed from the operator and the necessity of stooping to lift and separate the potatoes is avoided.

In digging potatoes with this implement the operator first anchors the standard in the soil, adjusts the shovel-digger so as to have it enter at the bottom of the hill, and then lays hold of the arm F with the left hand and the handle B with the right and moves the standard forward, while he depresses the handle B sufficiently to cause the shovel to pass under the potatoes. This being effected, he draws the upper end of the standard toward him and still continues to depress the handle, and thereby causes the shovel digger, with its load, to be raised out of and above the hill, as shown in red. At this moment he gives the handle B a vibratory motion from X to $y$ in the path of a circle, as illustrated by the dotted arc, and by so doing separates the dirt from the potatoes and causes it to escape between the tines and fall to the ground. He then discharges the potatoes thus separated in a regular row upon the ground by gradually elevating the upper end of the handle.

What I claim as my invention, and desire to secure by Letters Patent, is—

The employment of an open concave digger arranged and combined with a movable standard, substantially as and for the purpose set forth.

SILAS WOOLSON.

Witnesses:
D. CARSON, Jr.,
JOHN R. CUTTING.